(12) United States Patent
Matsuda

(10) Patent No.: US 7,325,828 B2
(45) Date of Patent: Feb. 5, 2008

(54) MULTI-STAGE GAS GENERATOR

(75) Inventor: Naoki Matsuda, Himeji (JP)

(73) Assignee: Daicel Chemical Industries, Ltd., Sakai-Shi, Osaka (JP)

( * ) Notice: Subject to any disclaimer, the term of this patent is extended or adjusted under 35 U.S.C. 154(b) by 107 days.

(21) Appl. No.: 11/265,303

(22) Filed: Nov. 3, 2005

(65) Prior Publication Data
US 2006/0091659 A1   May 4, 2006

Related U.S. Application Data

(60) Provisional application No. 60/625,948, filed on Nov. 9, 2004.

(30) Foreign Application Priority Data
Nov. 4, 2004   (JP)   .............................. 2004-320296

(51) Int. Cl.
*B60R 21/26* (2006.01)
(52) U.S. Cl. ...................... 280/736; 280/741; 280/742
(58) Field of Classification Search ................ 280/736, 280/737, 741, 742
See application file for complete search history.

(56) References Cited
U.S. PATENT DOCUMENTS

| 5,575,497 | A | * | 11/1996 | Suyama et al. .......... 280/730.1 |
|---|---|---|---|---|
| 5,622,380 | A | | 4/1997 | Khandhadia et al. ....... 280/736 |
| 5,628,528 | A | | 5/1997 | DeSautelle et al. ......... 280/736 |
| 5,934,705 | A | * | 8/1999 | Siddiqui et al. ............ 280/736 |
| 6,123,355 | A | * | 9/2000 | Sutherland ............... 280/728.2 |
| 6,149,193 | A | * | 11/2000 | Canterberry et al. ........ 280/741 |
| 6,547,277 | B1 | | 4/2003 | Adamini et al. ............ 280/741 |
| 6,848,708 | B2 | * | 2/2005 | Green et al. ................ 280/729 |
| 7,007,973 | B2 | * | 3/2006 | Canterberry et al. ........ 280/741 |
| 7,192,051 | B2 | * | 3/2007 | Takahara .................... 280/736 |

FOREIGN PATENT DOCUMENTS

| EP | 0960789 B1 | 12/2003 |
|---|---|---|
| JP | 11-334518 A | 12/1999 |

\* cited by examiner

*Primary Examiner*—Paul N. Dickson
*Assistant Examiner*—Joseph Rocca
(74) *Attorney, Agent, or Firm*—Birch, Stewart, Kolasch & Birch, LLP

(57) ABSTRACT

A multi-stage gas generator with which a plurality of sites (chest, waist, knees, etc.) on the body of a passenger can be protected together using a single gas generator is provided. A first gas discharge port 21 is connected to a chest-protecting air bag, a second gas discharge port 22 is connected to a waist-protecting air bag, and a third gas discharge port 23 is connected to a knee-protecting air bag. Gas generated in a first gas generating chamber 13 and a second gas generating chamber 14 is discharged from each discharging port to inflate and deploy the air bags for chest, waist and knee, and thus the body of the passenger is protected.

20 Claims, 2 Drawing Sheets

MULTI-STAGE GAS GENERATOR

CROSS-REFERENCE TO RELATED APPLICATIONS

This Nonprovisional application claims priority under 35 U.S.C. § 119(e) on U.S. Provisional Application No. 60/625,948 filed on Nov. 9, 2004, and under 35 U.S.C. § 119(a) on Patent Application No. 2004-320296 filed in Japan on Nov. 4, 2004, the entire contents of which are hereby incorporated by reference.

BACKGROUND OF THE INVENTION

1. Field of the Invention

The present invention relates to a multi-stage gas generator for an air bag apparatus used to protect passengers during a collision of a vehicle, and an air bag apparatus which uses this multi-stage gas generator.

2. Description of Related Art

Air bag apparatuses used to protect passengers during a vehicle collision are put to practical use in various types, such as an air bag for a driver side or an air bag for a front passenger side, so that optimum protection can be provided in accordance with the seating position of the passenger.

To enhance the passenger protection performance of an air bag for a driver side or air bag for a front passenger side, for example, it is desirable that the chest, waist, and knees of the passenger are all protected by air bags. However, the disposal space inside a vehicle is limited, and therefore it is sometimes impossible to provide an air bag apparatus at each of these sites. It is also desirable that the air bag deployment output be adjusted at each site in accordance with the physique, weight, height, and so on of the passenger.

JP-A No. 11-334518 discloses a multi-stage gas generator in which the interior of a container is partitioned into a first chamber and a second chamber by a partition wall, a gas ejecting hole of the first chamber is disposed as near as possible to the center of the container in the lengthwise direction, and a gas ejecting hole of the second chamber is disposed in an intermediate position in the lengthwise direction of the container. Thus a horizontally elongated bag can be inflated evenly to the left and right even when one of the first chamber and second chamber is activated.

SUMMARY OF THE INVENTION

An object of the present invention is to provide a multi-stage gas generator for an air bag apparatus, and an air bag apparatus which employs this multi-stage gas generator, with which a plurality of sites on the body of a passenger can be protected together by a combination of a single gas generator and a plurality of air bags.

As means for achieving this object, the present invention provides a multi-stage gas generator comprising a housing having a plurality of gas discharge ports, the interior of the housing being divided by at least one partition wall to form a plurality of independent gas generating chambers, air bag inflating means accommodated in each of the plurality of gas generating chambers, the plurality of gas discharge ports provided in each gas generating chamber, a plurality of air bags attached for use with the plurality of gas discharge ports.

As other means for achieving the object, the present invention provides a multi-stage gas generator comprising a housing having a plurality of gas discharge ports, the interior of the housing being divided by a single partition wall to form two independent gas generating chambers, air bag inflating means accommodated in each of the two gas generating chambers, the plurality of gas discharge ports provided in each of the two gas generating chambers, and in at least one gas generating chamber, the plurality of gas discharge ports being divided between two or more different areas, a plurality of air bags attached for use with the plurality of gas discharge ports.

The invention provides a multi-stage gas generator comprising a housing having a plurality of gas discharge ports, the interior of the housing being divided by at least one partition wall to form a plurality of independent gas generating chambers, air bag inflating means accommodated in each of the plurality of gas generating chambers, the plurality of gas discharge ports provided in each gas generating chamber, the plurality of gas discharge ports being in use for being attached to a plurality of air bags.

In each of the inventions described above, each of the plurality of gas generating chambers is formed surrounded by the housing and partition wall. When a single partition wall is provided, two gas generating chambers are formed, and when two or more partition walls are provided, three or more gas generating chambers are formed. The air bag inflating means are accommodated in each gas generating chamber.

A plurality of the gas discharge ports is provided in each gas generating chamber (in the wall of the housing which forms the gas generating chamber). The gas discharge ports may be provided evenly over the entirety of a single gas generating chamber, or may be provided locally in a part of the gas generating chamber.

When the gas discharge ports of the multi-stage gas generator are divided between two locations (one location in each of the two gas generating chambers), the air bag attached to the first gas discharge ports inflates and deploys about the chest of the passenger, and the air bag attached to the second gas discharge ports inflates and deploys about the knees or waist. In so doing, the passenger protection performance can be enhanced.

When the gas discharge ports of the multi-stage gas generator are provided in three locations (one location in each of three gas generating chambers, or two separate locations in one of two gas generating chambers and only one location in the other gas generating chamber), the air bag attached to the first gas discharge port (one or a plurality of gas discharge ports may be provided) inflates and deploys about the chest of the passenger, the air bag attached to the second gas discharge port (one or a plurality of gas discharge ports may be provided) inflates and deploys about the waist, and the air bag attached to the third gas discharge port (one or a plurality of gas discharge ports may be provided) inflates and deploys about the knees. In so doing, the passenger protection performance can be enhanced.

When the gas discharge ports of the multi-stage gas generator are provided in three locations, one air bag may be attached to the gas discharge ports in any two of the locations, and by discharging gas from either the gas discharge ports in only one of the two locations or the gas discharge ports in both locations in accordance with the impact on the vehicle, the degree of air bag inflation (i.e. the output of the gas generator) can be adjusted in two stages. For example, the air bag which inflates and deploys about the chest may be attached to the gas discharge ports in two of the three locations such that the degree of air bag inflation can be adjusted in two stages, and another air bag can be attached to the remaining gas discharge ports and inflated and deployed about the waist or knees.

It is preferable that the plurality of gas discharge ports comprises a plurality of groups each comprising a plurality of the gas discharge ports, that the plurality of gas discharge port groups is divided between two or more different areas of the housing, and that one air bag is attached for use with each gas discharge port group, or one air bag is attached for use with two or more of the gas discharge port groups.

And, it is preferable that the housing is cylindrical and that the plurality of gas discharge ports or gas discharge port groups is provided over a range of the cylindrical housing from one end thereof to the other end thereof.

Preferably, in the multi-stage gas generator air bag apparatus of the present invention, two or three air bags are attached for use, and each air bag is inflated and deployed in any two or three positions corresponding to the chest, waist, and knees of a passenger.

The air bag inflating means can comprise a gas generating agent, a pressurized gas and/or a combination thereof.

When a gas generating agent alone is used as the air bag inflating means, a known pyrotechnic inflator may be employed, and when pressurized gas is used mainly as the air bag inflating means, a known hybrid inflator may be employed.

As other means for achieving the object, the present invention provides an air bag apparatus comprising a combination of the above described multi-stage gas generator and a plurality of air bags.

According to the multi-stage gas generator of the present invention, a single gas generator can be combined with a plurality of air bags, and by activating the single gas generator, a plurality of sites (chest, waist, knees, etc.) on the body of a passenger can be protected together. Moreover, since only one gas generator is used, the required disposal space can be reduced.

DETAILED DESCRIPTION OF THE INVENTION

Figure 1:
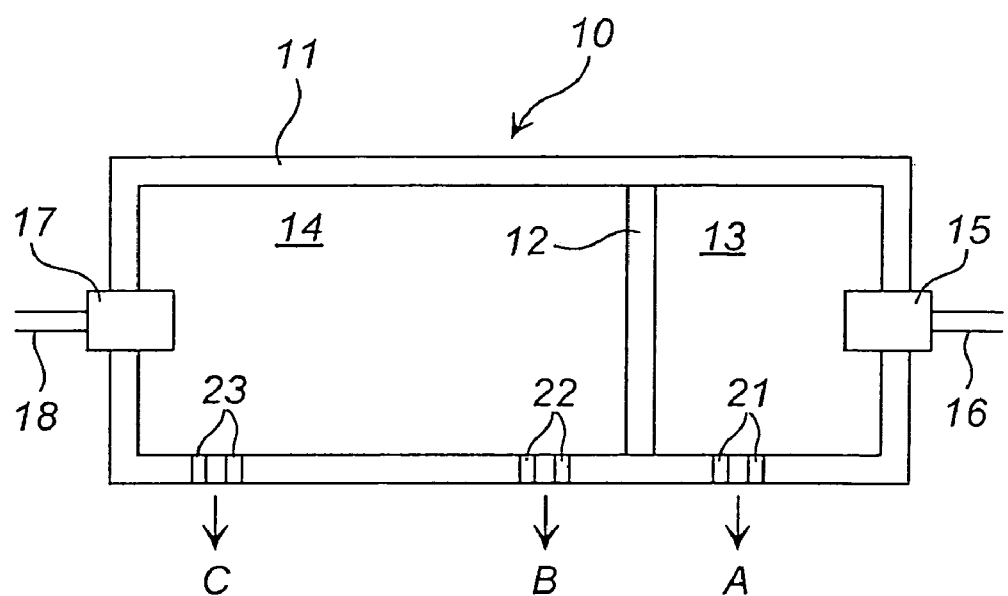
FIG. 1 is a schematic sectional view of a multi-stage gas generator in the axial direction thereof.

An embodiment of the present invention will be described using FIG. 1. FIG. 1 is a schematic sectional view of a multi-stage gas generator according to the present invention in the axial direction thereof.

In a gas generator 10, the interior of a cylindrical housing 11 is partitioned by a single partition wall 12 and thus divided completely into a first gas generating chamber 13 and a second gas generating chamber 14. The partition wall 12 may be fixed from the outside of the housing 11 by laser welding or the like, for example, but as long as the first gas generating chamber 13 and second gas generating chamber 14 can be separated from each other completely, the partition wall 12 may be movable so that the volume of the first gas generating chamber 13 and the volume of the second gas generating chamber 14 can be adjusted to a desired ratio.

A required amount of a gas generating agent, not shown in the drawing, is charged into the first gas generating chamber 13, and a first igniter 15 is mounted therein to ignite and burn the gas generating agent. The first igniter 15 is connected to a vehicle battery via a lead wire 16. The first gas generating chamber 13 comprises first gas discharge ports (a first gas discharge port group) 21 in the peripheral wall of the housing 11.

A required amount of a gas generating agent, not shown in the drawing, is charged into the second gas generating chamber 14, and a second igniter 17 is mounted therein to ignite and burn the gas generating agent. The second igniter 17 is connected to the vehicle battery via a lead wire 18. The second gas generating chamber 14 comprises second gas discharge ports (a second gas discharge port group) 22 and third gas discharge ports (a third gas discharge port group) 23 arranged separately in different areas of the peripheral wall of the housing 11. The second gas discharge ports 22 (the second gas discharge port group) are provided in positions close to the partition wall 12, whereas the third gas discharge ports (the third gas discharge port group) 23 are provided in positions close to the igniter 17.

The gas discharge ports do not have to be provided in concentrated fashion in a particular site of the housing 11, and may be provided separately over the entire range of the cylindrical housing 11 from one end to the other.

In FIG. 1, the volume of the first gas generating chamber 13 is illustrated as being smaller than the volume of the second gas generating chamber 14, but either gas generating chamber may have a greater volume, or the two gas generating chambers may have the same volume. Likewise, the amount of charged gas generating agent may be the same or different, and the composition (component types and ratios) of the gas generating agent may be the same or different. The volume ratio of the two gas generating chambers, and the volume and composition of the gas generating agent, are set in accordance with the target output of each gas generating chamber and the total target output of the multi-stage gas generator 10.

Note that the gas generating mechanism of the multi-stage gas generator 10 may be a well-known gas generating mechanism for a gas generator, and may be combined with other constitutional components of a well-known gas generator such as an enhancer for accelerating ignition of the gas generating agent, a coolant/filter for cooling and filtering the combustion gas, moisture-proof sealing tape that is adhered to the gas discharge ports from the inside, a retainer for adjusting the volume of the gas generating chambers, a collar on which the igniters can be mounted, and an O-ring disposed in the mounting positions of the igniters.

The multi-stage gas generator 10 of the present invention may be applied in combination with a plurality of air bags as a gas generator for use in an air bag apparatus. Air bags are attached directly to the gas discharge ports of the multi-stage gas generator 10, or via an appropriate adapter (shown as element "24" in FIGS. 2 and 3) or the like. In the case of an air bag apparatus for a driver side, the following combinations may be provided in accordance with the form of passenger protection to be provided by the air bag apparatus.

First Combination

Figure 2:
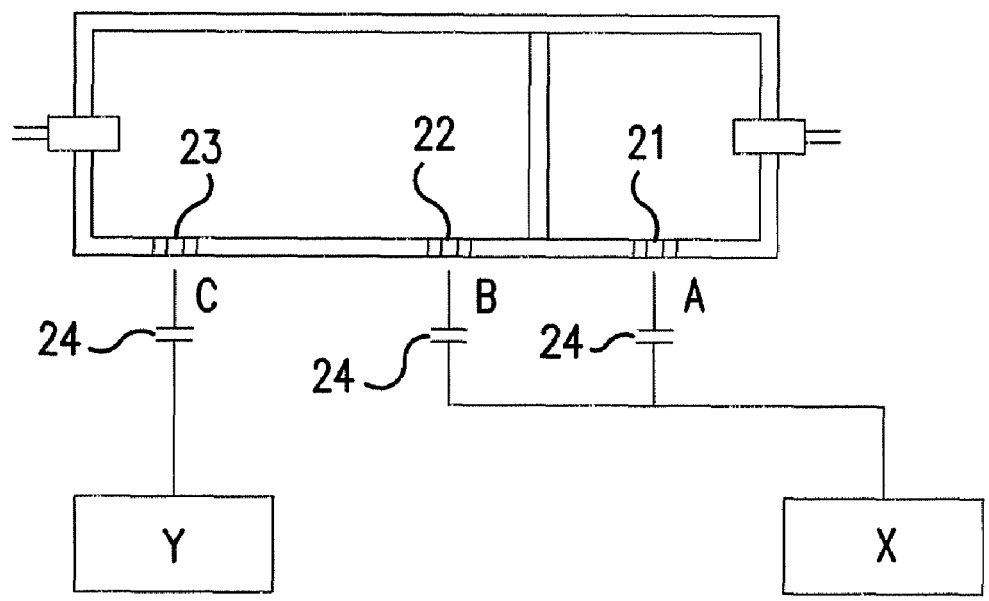
FIG. 2 is a schematic view showing the first combination.

As shown in FIG. 2, a first air bag X (for chest protection) is attached to the first gas discharge ports (first gas discharge port group) 21 and second gas discharge ports (second gas discharge port group) 22, and a second air bag Y (for waist protection) is attached to the third gas discharge ports (third gas discharge port group) 23.

By means of this combination, the first and the second air bags are inflated when the vehicle collides, and as a result, the chest and the waist (including the stomach) of the passenger can be protected.

Second Combination

Figure 3:
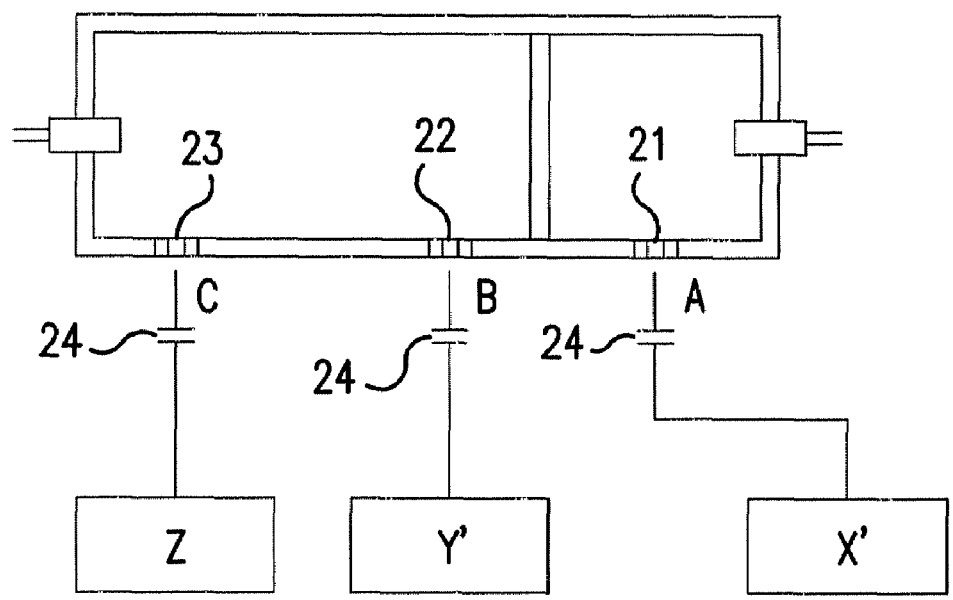
FIG. 3 is a schematic view showing the second combination.

As shown in FIG. 3, a first airbag x' (for chest protection) is attached to the first gas discharge ports (first gas discharge port group) 21, a second air bag Y' (for waist protection) is attached to the second gas discharge ports (second gas discharge port group) 22, and a third air bag Z (for knee protection), not shown in the drawing, is attached to the third gas discharge ports (third gas discharge port group) 23.

By means of this combination, the first through third air bags are inflated and deployed when the vehicle collides, and as a result, the chest, waist (including the stomach), and knees of the passenger can be protected.

The multi-stage gas generator shown in FIG. 1 uses a gas generating agent as air bag inflating means, and hence a well-known pyrotechnic inflator can be employed. Alternatively, in the present invention, a well-known hybrid inflator, which uses an inert gas such as argon or helium, nitrogen gas, or similar as the air bag inflating means, can be employed.

Next, an operation of the multi-stage gas generator 10 and air bags in the second combination described above (an air bag apparatus for use in lateral collisions) will be described.

When the vehicle collides, the first igniter 15 is activated, and as a result the gas generating agent in the first gas generating chamber 13 is burned, generating gas. This gas is discharged from the first gas discharge ports 21 (output A), causing the chest-protecting air bag to inflate and deploy.

The second igniter 17 is activated at the same time as the first igniter 15, and as a result the gas generating agent in the second gas generating chamber 14 is burned, generating gas. This gas is discharged from the second gas discharge ports 22 (output B), causing the chest-protecting air bag to inflate (i.e. output A+B), and is discharged simultaneously from the third gas discharge ports 23 (output C), causing the knee-protecting (or waist-protecting) air bag to inflate and deploy.

Hence when the vehicle collides, the chest of the passenger is protected by the air bag that is inflated and deployed by a pressure corresponding to the output A+B, and the knees (or waist) are protected by an air bag that is inflated and deployed by a pressure corresponding to the output C. By adjusting the volume of the gas generating chambers, the amount and composition of the gas generating agent, and so on at this time, the output A, output B, and output C can be set to desired values.

In the case of an air bag apparatus for use in lateral collisions, the two igniters are activated simultaneously as described above, but in the case of an air bag apparatus for a driver side when the collision is of moderate severity, the first igniter 15 may be activated before the second igniter 17.

In the case of an air bag apparatus for a driver side, the gap between the chest and steering wheel is usually smaller than the gap between the knees and the front face of the vehicle, and therefore by activating the first igniter 15 before the second igniter 17 such that the chest-protecting air bag is inflated first, a similarly high degree of passenger protection to that produced by simultaneous igniter activation can be exhibited. Note that measures may be taken such that when the collision is mild, only the first igniter 15 is activated.

As described above, the multi-stage gas generator of the present invention is capable of inflating and deploying a plurality of air bags using a single gas generator, and therefore the required disposal space can be reduced in comparison with a case in which a plurality of gas generators is used.

The multi-stage gas generator of the present invention may be applied to various types of known air bag apparatuses such as air bags for a lateral collision, curtain air bags, air bags for driver side, and air bags for a front passenger side.

What is claimed:

1. A multi-stage gas generator, comprising:
    a housing, an interior of the housing being divided by at least one partition wall to form at least two independent gas generating chambers; and
    air bag inflating means accommodated in each of the at least two independent gas generating chambers,
    wherein a first gas generating chamber includes at least a first gas discharge port and a second gas generating chamber includes at least a second gas discharge port and at least a third gas discharge port,
    the first gas discharge port is adapted to be attached to a first air bag,
    the third gas discharge port is adapted to be attached to a second air bag, and
    the second gas discharge port is adapted to be attached to an air bag different from the second air bag.

2. The multi-stage gas generator according to claim 1, wherein each of the first gas discharge port, the second gas discharge port, and the third gas discharge port comprises a plurality of groups each comprising a plurality of the gas discharge ports, the plurality of gas discharge port groups is disposed at two or more different areas of the housing.

3. The multi-stage gas generator according to claim 1, wherein the housing is cylindrical in shape, and the first gas discharge port, the second gas discharge port, and the third gas discharge port are provided over a range of the cylindrical housing from one end thereof to the other end thereof.

4. The multi-stage gas generator air bag apparatus according to claim 1, wherein the second gas discharge port is adapted to be attached to a third air bag, and
    the first air bag, the second air bag, and the third air bag are inflated and deployed at positions corresponding to the chest, waist and knees of a passenger.

5. The multi-stage gas generator according to claim 1, wherein the air bag inflating means comprise a gas generating agent, a pressurized gas or a combination thereof.

6. An air bag apparatus, comprising:
    the multi-stage gas generator according to claim 1;
    a first air bag attached to the first gas discharge port; and
    a third air bag attached to the second gas discharge port.

7. The air bag apparatus according to claim 6, wherein the second gas discharge port is also attached to the first air bag.

8. The air bag apparatus according to claim 6, further comprising:
    a third air bag attached to the second gas discharge port.

9. The multi-stage gas generator according to claim 1, wherein the first gas discharge port and the second gas discharge port are adapted to be connected to the first air bag.

10. The multi-stage gas generator according to claim 1, wherein the second gas discharge port is adapted to be connected to a third air bag.

11. A multi-stage generator, comprising:
    a housing, an interior of the housing being divided by a single partition wall to form a first gas generating chamber and a second gas generating chamber; and, air bag inflating means accommodated in each of the first gas generating chamber and the second gas generating chamber, wherein the first gas generating chamber includes a first gas discharge port and the second gas generating chamber include at least a second gas discharge port and at least a third gas discharge port, and the second gas discharge port and the third gas discharge port are provided at different areas of the first gas generating chamber, the first gas discharge port is adapted to be attached to a first air bag, the third gas discharge port is adapted to be attached to a second air bag, and the second gas discharge port is adapted to be attached to an air bag different from the second air bag.

12. The multi-stage gas generator according to claim 11, wherein each of the first gas discharge port, the second gas discharge port, and the third gas discharge port comprises a plurality of groups each comprising a plurality of the gas discharge ports, the plurality of gas discharge port groups is disposed at two or more different areas of the housing.

13. The multi-stage gas generator according to claim 11, wherein the housing is cylindrical in shape, and the first gas discharge port, the second gas discharge port, and the third gas discharge port are provided over a range of the cylindrical housing from one end thereof to the other end thereof.

14. The multi-stage gas generator air bag apparatus according th claim 11, wherein the second gas discharge port is adapted to be attached to a third air bag, and the first air bag, the second air bag, and the third air bag are inflated and deployed at positions corresponding to the chest, waist, and knees of a passenger.

15. The multi-stage gas generator according to claim 11, wherein the air bag inflating means comprise a gas generating agent, a pressurized gas or a combination thereof.

16. An air bag apparatus, comprising:

the multi-stage gas generator according to claim 11;

a first air bag attached to the first gas discharge port; and a third air bag attached to the second gas discharge port.

17. The air bag apparatus according to claim 16, wherein the second gas discharge port is also attached to the first air bag.

18. The air bag apparatus according to claim 16, further comprising:

a third air bag attached to the second gas discharge port.

19. The multi-stage gas generator according to claim 11, wherein the first gas discharge port and the second gas discharge port are adapted to be connected to the first air bag.

20. The multi-stage gas generator according to claim 11, wherein the second gas discharge port is adapted to be connected to a third air bag.

* * * * *